Sept. 16, 1952 D. B. WIESE ET AL 2,610,989
ELECTRICAL MEASURING INSTRUMENT
Filed Feb. 21, 1947
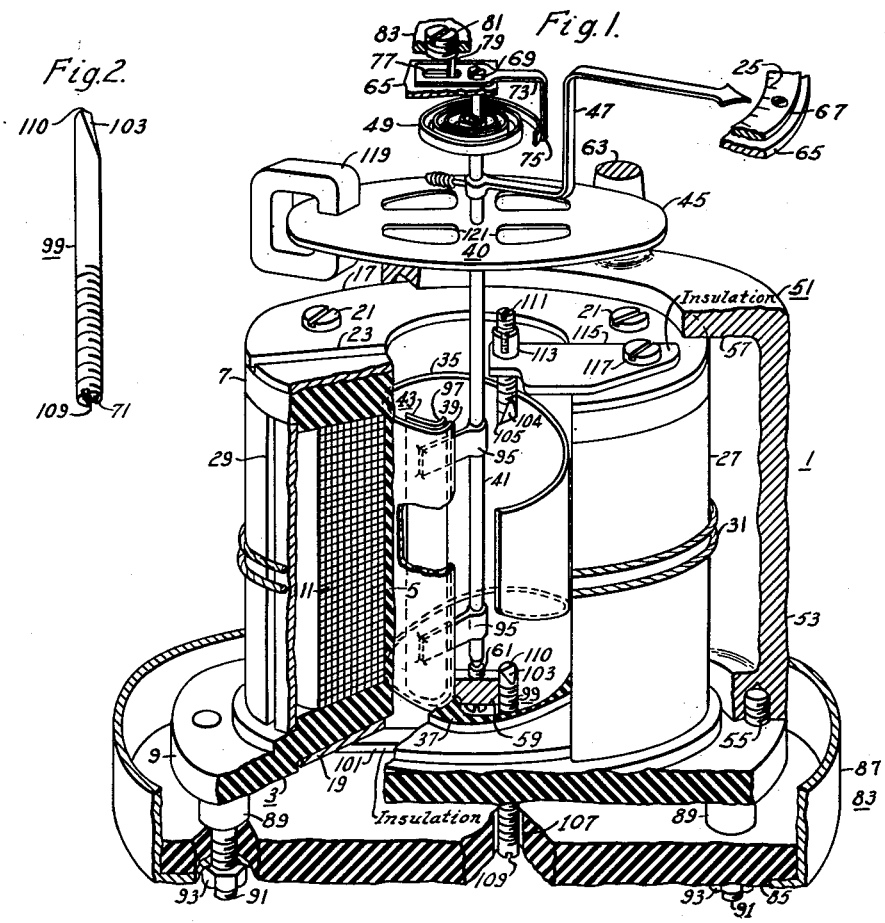
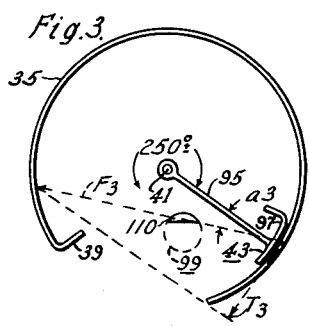
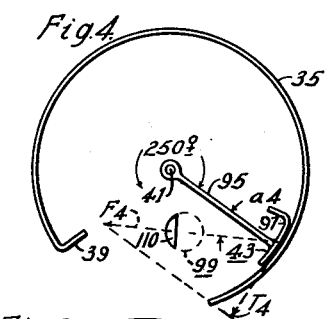
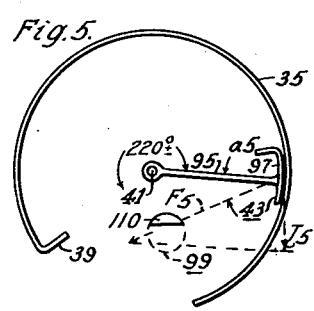
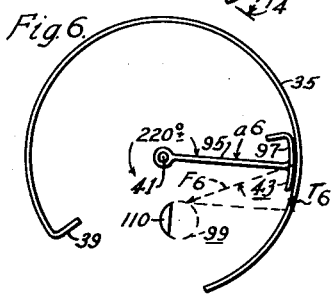
WITNESSES:
H. F. Susser
Arthur Stewart
INVENTORS
David B. Wiese and
Henry L. Bernarde.
BY
C. L. Freedman
ATTORNEY Patented Sept. 16, 1952

2,610,989

UNITED STATES PATENT OFFICE 2,610,989

ELECTRICAL MEASURING INSTRUMENT

David B. Wiese, East Orange, and Henry L. Bernarde, Union, N. J., assignors to Westinghouse Electric Corporation, East Pittsburgh, Pa., a corporation of Pennsylvania Application February 21, 1947, Serial No. 730,092

7 Claims. (Cl. 171—95)

This invention relates to electrical measuring instruments and it has particular relation to the moving magnetic-vane type of instrument and to the adjustment and calibration thereof.

In prior art electrical instruments, adjustments are provided to obtain a desired up-scale reading when a suitable electrical current is flowing through the winding of the instrument. However, in quantity production of such instruments certain variations usually exist which do not permit the employment of a printed or premarked scale but necessitate handmarking of the scale.

The invention may find application in any of several types of electrical instruments such as the repulsion type of instrument, the attraction type of instrument, or the repulsion-attraction type of instrument, the repulsion-attraction type of instrument being hereinafter described for purposes of illustration.

In accordance with the invention an instrument is provided wherein the reading of the instrument for a predetermined energization and the scale distribution of the instrument are both adjustable. In one embodiment of the invention, a moving-vane or moving iron instrument is provided with suitable adjustments permitting the utilization of printed scales.

By a specially designed adjustable attraction magnetic element, as hereinafter more fully described, it is possible to vary the magnitude of magnetic attraction and the angle of magnetic attraction between the adjustable attraction magnetic element and the moving magnetic element, thereby making it possible to obtain a desired up-scale instrument reading and, in addition, to have a choice of several scales or scale distributions, particularly over the upper portion of the scale, to facilitate the utilization of a premarked or preprinted scale on the instrument.

It is an object of the invention to provide an improved electrical instrument of the moving magnetic-vane type.

It is a further object of the invention to provide a moving magnetic-vane type of instrument which is adjustable to effect a plurality of scale distributions as well as a predetermined indication, particularly at up-scale or full-scale positions of the moving magnetic vane.

It is a further object of the invention to provide a moving magnetic-vane type of instrument with an attraction magnetic element that is adjustable to vary transversely and longitudinally its effective position with respect to the moving magnetic vane.

It is still a further object of the invention to provide an electromagnetic instrument having a moving magnetic element, with a specially designed and shaped magnetic element or calibrator which may be adjusted to a selected fixed position, to vary the angle of magnetic force as well as the magnitude of magnetic force acting upon the moving magnetic element.

Other objects of the invention will be apparent from the following description, taken in conjunction with the accompanying drawing, in which:

Figure 1 is a view in perspective, with parts broken away, of an electrical instrument, embodying the invention;

Fig. 2 is a perspective view of a preferred form of calibrator;

Fig. 3 is a plane view showing schematically the relative position of the magnetic elements, in an electrical instrument, the moving magnetic element being at approximately full-scale position, and the attraction magnetic element or calibrator with its pole-tip, being in a selected first position, and showing, by a vector diagram, the magnetic forces acting between the moving magnetic element and the pole-tip of the calibrator;

Fig. 4 is a view similar to Fig. 3, except that the calibrator with its pole-tip is rotated about its axis clockwise exceeding 180° from the first position, to a second position;

Fig. 5 is a view similar to Fig. 3, except that the moving magnetic element is at an intermediate up-scale position which is below the full-scale position, the calibrator with its pole-tip being at the first position; and Fig. 6 is a view similar to Fig. 5, except that the calibrator with its pole-tip is at the second position.

Referring to the drawing, Figure 1 shows a moving-iron instrument which may be generally similar to that disclosed in the copending Rights application, Serial No. 515,263, filed December 22, 1943 (issued on March 21, 1950, as United States Patent No. 2,501,356), and assigned to the same assignee. The instrument has a stator assembly 1 which includes a coil spool 3. The coil spool 3 is formed with a tubular portion 5 having flanges 7 and 9 at its ends. The tubular portion 5 and the flanges 7 and 9 conveniently may be molded as an integral unit from a suitable insulating material such as a phenolic resin. A winding 11 surrounds the tubular portion 5 and has terminal leads which project through openings (not shown) in the flange 9 and in base member 85. When energized, the winding 11 produces a magnetic field within the tubular portion 5. To assist in directing magnetic flux into the tubular portion 5, magnetic members 17 and 19 are suitably secured to the flanges 7 and 9 as by cement or machine screws 21. The magnetic members 17 and 19 may take the form of rings constructed of a magnetic material such as soft iron. If the instrument is to be employed for alternating-current measurements, the ring 17 may be provided with a slot 23 for the purpose of restricting eddy-current flow therein. A somewhat larger slot or gap may be provided in the ring 19 for the same purpose and for the additional purpose of permitting passage therethrough of the terminal leads. A magnetic band 27 which surrounds the winding 11 may be formed of a suitable magnetic material such as soft iron. The ends of the band 27 may be spaced to provide an axial slot 29 to restrict flow of eddy-currents therein. The band 27 may be secured in position by a few turns of cord 31 secured therearound. The ring 19 is provided with a noncircular opening which is substantially in alignment with the tubular portion 5.

A fixed magnetic element 35 of substantially cylindrical shape is disposed in the tubular portion 5 and is securely cemented to the tubular portion. To facilitate proper location of the fixed magnetic element 35, the tubular portion may be provided with an integral abutment 37 against which one end (which may be termed the down-scale end) of the fixed magnetic element is placed. The fixed magnetic element 35 may be formed of suitable magnetic sheet material such as soft iron.

By inspection of Fig. 1, it will be observed that the axial length of the fixed magnetic element or fixed iron 35 varies from a predetermined value adjacent the down-scale end thereof to a smaller length adjacent the remaining end which may be termed the up-scale end thereof. For a purpose hereinafter set forth, the down-scale end of the fixed iron 35 is bent inwardly to provide a lip or flange 39 having substantial surfaces which are substantially parallel to a plane containing the axis of the fixed iron 35.

The instrument has a rotor assembly 40 which includes a shaft 41, a moving magnetic element 43, a damping member or disk 45, a pointer 47, and a spiral control spring 49. The rotor assembly is supported by a frame 51 which includes a shell 53 secured to the flange 9 by suitable machine screws 55. Conveniently the frame 51 may be an aluminum casting. The shell 53 has a flange 57 which overlies the ring 17 and which has an L-shaped bracket 59 (not fully shown) projecting therefrom into the tubular portion 5. The bracket 59 has a jewel or bearing screw 61 in threaded engagement therewith for receiving one end of the shaft 41. The flange 57 also has pillars 63 projecting therefrom about the damping member 45. A bridge plate 65 is attached to these pillars by suitable machine screws (not shown). A preprinted scale or dial 67 with indices or scale markings 25 thereon is secured to the bridge plate 65 by suitable means such as screws. The bridge plate 65 has in threaded engagement therewith a jewel or bearing screw 69 for receiving an end of the shaft 41. Also the bridge plate 65 has an arcuate opening therein through which the pointer 47 projects for rotation with the shaft 41 as a unit with respect to the flange 51 and to the dial 67.

The bridge plate 65 also carries a lever 73 which is mounted for rotation about the axis of the shaft 41. This lever 73 has a lug 75 projecting therefrom to which the outer end of the spiral control spring 49 is secured by solder. In addition, the lever 73 has a slot 77 for receiving a pin 79 eccentrically secured to a zero adjusting button 81. The button 81 is rotatable with respect to a portion of a housing 83 which also includes a base member 85 and a shell 87. It will be understood that the housing surrounds the electrical instrument but is broken away in Fig. 1 for the purpose of exposing the instrument. Spacers 89 project from the flange 9 to engage the base member 85 and have studs 91 projecting through openings in the base member. Nuts 93 cooperate with the studs 91 to secure the instrument to the base member 85.

The moving magnetic element 43 is formed of a suitable material such as soft iron and is attached to the shaft 41 by means of suitable brackets 95. It will be observed that the moving magnetic element or iron 43 has an arcuate surface adjacent the interior surface of the fixed iron 35. When magnetic flux passes through the tubular portion 5, the fixed iron 35 and moving iron 43 are magnetized to develop a substantial repulsion force therebetween. Since the fixed iron 35 is tapered in an up-scale direction, a component of the repulsion force is in a tangential direction with respect to the path of movement of the moving iron 43 and urges the moving iron in an up-scale direction. Such motion of the moving iron is opposed to the bias exerted by the spiral control spring 49.

The damping member 45 may take the form of an electroconductive disk which is positioned for rotation between the poles of a permanent magnet 119. As well understood in the art, the permanent magnet 119 and the damping disk 45 cooperate to dampen rotation of the rotor assembly. To lighten the damping disk and to permit inspection therethrough of the mechanism with the tubular portion 5, a plurality of openings 121 are provided in the damping disk.

When the moving iron 43 is in the position illustrated in Fig. 1, the flange 39 extends across an edge of the moving iron 43. Consequently magnetic flux passing through the tubular portion 5 produces a repulsion force acting between the flange 39 and the associated edge of the moving iron 43. This repulsion force corresponds to an additional torque which urges the moving iron in an up-scale direction. To increase this additional torque, the moving iron 43 is provided with a lip or flange 97 which is adjacent the flange 39 when the moving iron 43 is in the position illustrated in Fig. 1. The flanges 39 and 97 materially increase the sensitivity of the instrument when the moving iron 43 is in the vicinity of the flange 39. Consequently the flanges tend to open the scale of the instrument adjacent the down-scale end thereof.

In order to improve the performance of the instrument when the moving iron 43 is adjacent the up-scale end of the fixed iron 35, an additional fixed magnetic element is provided for influencing the movement of the moving iron 43. This additional magnetic element conveniently may be in the form of a soft iron screw 111 which is positioned to act as an attraction iron. When the moving iron 43 is adjacent the up-scale end of the fixed iron 35, an attraction force is developed between the moving iron 43 and the attraction iron 111 which increases the resultant torque acting to urge the moving iron 43 toward its extreme up-scale position. The attraction iron 111 is mounted on a supporting strip 115 which may be formed of any suitable material and is secured to the flange 7 by means of machine screws 117, only one machine screw being shown. These screws 117 may be removable, but in most applications, they may be non-removable or drive screws. If formed of electroconductive material, the strip 115 may be insulated from the ring 17 to reduce eddy-current flow therethrough. If desired, however, the strip 115 may be formed of an insulating material such as a phenolic resin. The strip 115 has a bushing 113 extending therethrough which is threaded internally for receiving the male threads of the attraction iron 111. The bushing 113 may be of resilient construction and may be split to grip the attraction iron 111 securely. Because of its resilient action, the bushing retains the attraction iron 111 in any position to which it is adjusted.

If the screws 117 are removable, the attraction iron 111 and its supporting strip 115 may be removed as a unit from the flange 7. Such removal does not destroy the adjustment of the attraction iron 111. Consequently, for such a construction, if it is necessary to remove the strip 115 and attraction iron 111 for servicing the instrument or for other reasons, it is generally not necessary to readjust the position of the attraction iron 111 upon reassembling the instrument.

Although a single attraction iron, such as attraction iron 111, has been found to be sufficient in most cases, a second attraction magnetic element or calibrator 99 may be employed either along with, or in place of, the attraction iron 111. The calibrator 99 is also a screw of soft iron having threads which engage the internal threads of a bushing (not shown), similar to bushing 113 described above. The calibrator 99 is similarly threaded into the bushing. The bushing is mounted on supporting strip 101 which is secured to the flange 9 by means of screws. It will be noted that the calibrator 99 projects through an opening 107 in the base member 85 and that the calibrator has a slot 109 which is externally accessible. For this reason, the calibrator 99 may be adjusted externally of the housing 83.

By employing the calibrator 99 along with the attraction iron 111, an additional attraction force is available for urging the moving iron 43 in an up-scale direction when the moving iron 43 is in an up-scale position.

The invention employs a magnetic element having a surface with an inclination or a surface eccentric of an axis about which the magnetic element may be rotated. The magnetic element may take the form of the calibrator 99 shown in Fig. 2.

In this embodiment, the calibrator 99 has a slot 109 at one end thereof into which a tool, such as a screw driver, may be inserted, and is provided at the other end with a bevel 103 which defines a pole-tip 110. The intermediate or body portion of the calibrator 99 is a cylindrical screw as above described.

In Fig. 1, the calibrator 99 with its bevel 103 is shown positioned in the instrument. To facilitate adjustment of the calibrator 99 when the instrument is completely assembled, an indicia, such as arrow 71 (see Fig. 2) may be so placed at the end adjacent the slot 109 that one may readily observe the angular position of the bevel 103 with respect to the axis of the calibrator 99, even though the bevel 103 is concealed from view. As illustrated in Fig. 1, the attraction iron 111 may also be provided with a bevel 104 defining a pole-tip 105. The attraction iron 111 and the calibrator 99 are preferably identical and similarly positioned in the instrument adjacent the path of movement of the moving magnetic element 43, except that the attraction iron 111 extends downwardly through supporting strip 115 and the calibrator 99 extends upwardly through supporting strip 101. In view of the similarity, the following description, with respect to the calibrator 99, may be equally applicable to the attraction iron 111.

It is believed that the construction and operation of the instrument illustrated in the drawing now may be set forth. After the winding 11 is applied to the spool 3, the fixed iron 35, the rings 17 and 19, and the band 27 are attached to the spool. In addition, the calibrator 99 and its supporting strip 101 are secured to the flange 9 by means of screws.

The rotor assembly 40 is separately assembled by securing to the shaft 41 the brackets 95 with the moving iron 43 secured thereto, the damping disk 45, the pointer 47 and the inner end of the spiral control spring 49. The rotor 40 is next assembled in the frame 51 by passing the moving vane 43 through the centrally disposed opening in the flange 57. The bridge plate 65, with dial 67 attached thereto, is slipped over the pointer 47 and is secured to the pillars 63 by means of machine screws. The bearing screws 61 and 69 are adjusted to position the rotor assembly 40 for rotation with respect to the frame 51. The lug 75 next is soldered to the outer end of the spiral control spring 49.

The frame 51, together with the rotor assembly 40 mounted therein, is positioned as a unit on the flange 9 and is secured to the flange by means of the machine screws 55. During this operation, the bracket 59 and the moving iron 43 pass through the tubular portion 5 into the position illustrated in Fig. 1. The damping magnet 119 is positioned with its pole faces adjacent the disk 45 and is secured to the stator assembly by suitable means (not shown).

The entire instrument in assembled condition is placed on the base member 85 and is secured to the base member by means of the nuts 93. The remainder of the housing 83 is finally secured to the base member 85 to complete the assembly of the instrument and its housing. By following a reverse procedure, the instrument may be disassembled for inspection and servicing.

In order to adjust the instrument for operation, the button 81 and the calibrator 99 are actuated without disturbing the housing 83. With the winding 11 deenergized, the button 81 is rotated to bring the pointer 47 to its correct position for indicating, with respect to the scale markings 25 on dial 67, the deenergized condition of the winding 11. Next, a current having a known value equal approximately to the current required to rotate the pointer 47 approximately 250° to its extreme up-scale position is passed through the winding 11. The calibrator 99 then is rotated by means of a screw driver positioned in the slot 109 until the pointer 47 is at its correct position for the value of current passing through the winding 11. Further adjustment of the calibrator 99 may be necessary, however, to correct the up-scale calibration of the instrument.

As hereinafter pointed out the calibrator 99 may have any one of a number of positions, each effective for locating the pointer at its correct up-scale location. However, each of such positions of the calibrator produces a different scale distribution.

When current is passed through the winding 11, magnetic flux is produced which flows through the space within the tubular portion 5, the rings 17 and 19 and the band 27. This magnetic flux also flows through the fixed iron 35 and the moving iron 43 in an axial direction to develop a repulsion force therebetween. Since the fixed iron 35 is tapered in an up-scale direction, the repulsion force has a torque component which urges the moving iron 43 in the up-scale direction.

If the current flowing through the winding 11 is sufficient to bring the moving iron 43 within the zone of influence of the calibrator 99, an attraction force is developed between the moving iron 43 and the calibrator 99. This is for the reason that, as viewed in Fig. 1, the upper end of the calibrator 99 is adjacent to the path of travel of the lower end of the moving iron 43. Consequently, the magnetic polarities of these ends are opposite and the force therebetween is one of attraction.

To determine whether a further adjustment of the calibrator 99 is necessary to obtain the proper scale distribution with respect to scale markings 25 adjacent the up-scale position of the pointer 47, an electrical current is caused to flow through the winding 11 having a known value equal approximately to the current required to rotate the moving iron 43 and the pointer 47 to a second up-scale position below the full-scale position but not below a position where substantial magnetic attraction exists between the calibrator 99 and the moving iron 43. If the second up-scale position of the pointer 47 corresponds with the proper scale markings 25 on the dial 67 for the electrical current flowing in the winding 11, the calibration, at least with respect to that position, does not need to be varied.

However, it is very likely that the second and other up-scale positions of the pointer 47 adjacent its full up-scale position, will frequently be either all above or below the proper scale markings 25 at the upper end of the dial 67. By further adjusting the calibrator 99 and utilizing its bevel 103, the scale distribution over the upper end of the dial may be varied so that for various known values of electrical current flowing in the winding 11 the corresponding up-scale positions of the pointer 47 will be at the proper scale markings 25 on the dial 67.

To explain the manner in which the bevel 103 may be employed, Fig. 3 shows schematically the fixed magnetic element 35, the moving magnetic element 43 and the calibrator 99. The moving magnetic element 43 is supported by the bracket 95 with respect to the axis or shaft 41 and is shown in its full up-scale position which is approximately 250° clockwise rotation about the shaft 41 from its zero position. The moving magnetic element 43 moves in a path adjacent the fixed magnetic element 35. The calibrator 99 is positioned adjacent the extreme up-scale position of the moving magnetic element 43 at an intermediate point between the up-scale end of the fixed magnetic element 35 and the shaft 41. With respect to the calibrator 99 in Fig. 3, the full-line segment represents its pole-tip 110 in a first position. By rotating the calibrator 99, which is an attraction magnetic element, about its axis, the direction of the effective magnetic attraction force acting upon the moving magnetic element 43 may be varied as a result of the angular movement of the pole-tip 110.

Referring to the magnetic force vector diagram in Fig. 3, $F_3$ represents the magnitude of magnetic attraction force acting between the moving magnetic element 43 and the pole-tip 110 of the calibrator 99 in its first position. The magnetic attraction force $F_3$, acting upon the moving magnetic element, is at an angle $a_3$ with respect to a line extending radially from the axis of shaft 41 through the moving magnetic element 43. Because of the nearness of the pole-tip 110 to the moving magnetic element 43, the magnitude of magnetic attraction force $F_3$ is relatively large. The force $F_3$ has a resulting tangential force component $T_3$ acting upon the moving magnetic element 43 to urge it in a clockwise direction.

Referring to Fig. 4, the magnetic elements are in the same relative position as shown in Fig. 3, the moving magnetic element being again rotated clockwise approximately 250° from its zero position. In Fig. 4, the calibrator 99 with its pole-tip 110 is rotated clockwise more than 180° to a selected second position which will produce a resulting tangential force component $T_4$ equal to $T_3$ in Fig. 3, the tangential force in each case being the resulting force acting upon the moving magnetic element 43 to urge it in a clockwise direction. To compare the magnitude and direction of the magnetic attraction forces in Figs. 3 and 4, it will be observed that the magnitude of Force $F_3$ is greater than $F_4$ and that angle $a_4$ is greater than $a_3$.

In Fig. 5, the angular position of the calibrator 99 with its pole-tip 110, is in the first position, the same as in Fig. 3. The magnetic elements are also in the same relative positions as in Fig. 3, except that the moving magnetic element 43 is rotated up-scale only approximately 220° from its zero position to a position below the full-scale position. To compare the vector diagrams in Figs. 3 and 5, the magnetic force $F_5$ is less than $F_3$ since the distance between the moving magnetic element 43 and the pole-tip 110 is greater in Fig. 5 than in Fig. 3. The angle of magnetic attraction $a_5$ is greater than angle $a_3$. The resulting tangential force $T_5$ is only slightly less than $T_3$.

In Fig. 6, the moving magnetic element 43 is again rotated clockwise approximately 220° as in Fig. 5 and the angular position of the pole-tip 110 is in the second position, the same as in Fig. 4.

In comparing Figs. 5 and 6, $F_5$ is greater than $F_6$. The resulting tangential force $T_5$ is considerably greater than $T_6$. In comparing Figs. 4 and 6, $F_4$ is greater than $F_6$, and $T_4$ is considerably greater than $T_6$.

It is important to observe that for the first position of the pole-tip 110, as shown in Figs. 3 and 5, the resulting tangential forces $T_3$ and $T_5$ acting upon the moving magnetic element 43 are closely alike whether the moving magnetic element is rotated clockwise approximately 220° or 250°. For the second position of the pole-tip 110 as shown in Figs. 4 and 6, the resulting tangential forces $T_4$ and $T_6$ are considerably different. Therefore, the first and second positions of the pole-tip 110 produce similar tangential forces ($T_3$ and $T_4$) when the moving magnetic element 43 is at full-scale position and considerably different tangential forces when the moving magnetic element 43 is slightly below full-scale position. In other words, the first position of the pole-tip 110 produces a different scale distribution than the second position of the pole-tip 110.

For the purpose of more clearly illustrating the nature of the invention, the vector forces set forth in Figs. 3, 4, 5 and 6 are intended only to indicate in a general way the variations produced by changing the angular position of either the moving magnetic element 43 or the pole-tip 110. The relative magnitude and direction of the magnetic forces indicated in the vector diagrams depart to some degree from the values likely present in the instrument herein described, the magnetic forces resulting from the portion of the calibrator 99 adjacent the pole-tip 110 being largely ignored in the magnetic force vectors illustrated by the vector diagrams.

It will be observed in Fig. 1 that the calibrator 99 is rotatable about its own axis and that it is adjustable in a direction along its own axis and in a direction parallel to shaft 41. An adjustment is effected by rotating the calibrator 99 about its own axis to advance or retract it. By employing the bevel 103, or its equivalent, the calibrator 99 may be advanced or retracted several turns, six to eight turns being a typical case, and by adjusting the angular position of the bevel 103 for each turn, a desired magnetic attraction force both as to magnitude and direction may be obtained with respect to the moving magnetic element 43 in the full up-scale position. As indicated in Figs. 3 and 4, two angular positions of the bevel 103 are usually available for each turn of the calibrator, to obtain the desired magnetic attraction force acting between the calibrator 99 and the moving magnetic element 43 in its full up-scale position. Each angular position of the bevel produces a different scale distribution adjacent the full-scale position. Therefore, in the typical case, twelve to sixteen (2 times 6 or 8) different scale distributions are obtainable by adjusting the calibrator 99. With the large number of scale distributions available, one may readily select a distribution which corresponds with a suitable preprinted or premarked scale. This alleviates the necessity of calibrating the dial 67 or of adding the scale markings 25 thereto by hand to correspond with the various positions of the pointer 47 for various predetermined electrical currents flowing in the winding 11.

As the calibrator 99, with its bevel 103, is rotated and advanced upwardly adjacent the path of the moving magnetic element 43, the effective length of the calibrator adjacent the pole-tip 110 gradually increases. The cross-section of the calibrator 99 gradually changes from a segment at the pole-tip 110, which has a comparatively large eccentric movement with respect to the axis of the calibrator 99 when the calibrator 99 is rotated, to a circle, which has no eccentric movement, at the body of the calibrator 99 adjacent the bevel 103. As the effective length of the calibrator increases, the effective transverse movement of the calibrator, when rotated, decreases with respect to the moving magnetic element 43. As the effective length of the calibrator increases, variations in the effective distance between the moving magnetic element 43 and the calibrator 99, when rotated, also decrease, such variations being the result of the eccentric movement of the end of the calibrator 99 adjacent the pole-tip 110 with respect to the axis of the calibrator 99. By means of the bevel 103, the effective position of the calibrator may be changed transversely or longitudinally with respect to the moving magnetic element 43, to obtain the desired up-scale distribution.

By employing and adjusting the attraction magnetic element 111, along with the calibrator 99, still further variations in the scale distribution are obtainable.

Although the invention has been discussed with reference to certain specified embodiments thereof, numerous modifications are possible. Therefore, the invention is to be restricted only by the appended claims as interpreted in view of the prior art.

We claim as our invention:

1. In an electrical instrument, a first magnetic element, a supporting structure, means for supporting the first magnetic element for rotation about a first axis relative to the supporting structure, a second magnetic element having at an extremity thereof projecting toward the path of rotation of said first magnetic element a surface nonconcentric with its axis disposed adjacent the path of rotation of the first magnetic element, means effective when energized for directing magnetic flux through the magnetic elements for developing a force therebetween for affecting movement of the first magnetic element about said first axis relative to the supporting structure, adjusting means cooperating with the supporting structure to vary the force acting between the elements, said adjusting means providing for movement of the second magnetic element axially and for rotation of the second magnetic element about its axis to vary the distance between points on said surface and said first axis.

2. In an electrical instrument, a moving magnetic element, a supporting structure, means supporting the moving magnetic element for movement relative to the supporting structure, an adjustable magnetic element disposed adjacent the path of movement of the moving magnetic element, means effective when energized for directing magnetic flux in a series path through the magnetic elements for developing a force therebetween for affecting movement of the moving magnetic element relative to the supporting structure, the adjustable magnetic element having a portion eccentric of an axis about which the adjustable magnetic element may be rotated to vary the position of said portion with respect to the axis and the moving magnetic element and means mounting the adjustable magnetic element for adjustment in the direction of the axis, whereby the force between the magnetic elements may be varied in magnitude and/or in direction with respect to the moving magnetic element.

3. In an electrical instrument, a winding, a moving magnetic element, means mounting said moving magnetic element for angular movement relative to a first axis, an adjustable magnetic element having a second axis substantially parallel to the first axis and having a surface eccentric of said second axis, said magnetic elements being positioned in the magnetic field produced by current flowing in said winding to develop a torque therebetween, and means mounting one of said magnetic elements for movement with respect to the other of said magnetic elements angularly about said second axis and in a direction having a component parallel to said first axis, the relative movements of said magnetic elements being effective for varying the resultant magnetic force acting upon said said moving magnetic element.

4. In an electrical measuring instrument, a winding, a moving magnetic element, a fixed magnetic element, means mounting said moving magnetic element for rotation relative to said fixed magnetic element, said magnetic elements being disposed in the magnetic field produced by current flowing in said winding to develop a repulsion force tending to rotate said moving magnetic element relative to said fixed magnetic element in a predetermined direction, an attraction magnetic element having an axis, and surfaces concentric and eccentric of said axis, disposed in said magnetic field to develop an attraction force acting between said attraction magnetic element and said moving magnetic element to urge said moving magnetic element in said predetermined direction and means mounting said attraction magnetic element for rotation about said axis and for movement along said axis of rotation of said moving magnetic element to vary said attraction force.

5. In an electrical instrument, a stator assembly including a winding, a rotor assembly including a moving magnetic element, means mounting said rotor assembly for rotation relative to said stator assembly, an adjustable magnetic element associated with said stator assembly, said adjustable magnetic element having a surface with an inclination, eccentric of a first axis positioned in the magnetic field produced by current flowing in said winding, said magnetic elements being positioned in the magnetic field to develop a torque between said magnetic elements which is responsive to said current, and screw means mounting said adjustable magnetic element on said stator assembly for angular movement of said surface relative to said first axis and for adjustment in a direction parallel to the axis of rotation of said moving magnetic element, said axes being spaced and substantially parallel, said screw means being operable to move said adjustable magnetic element relative to said stator assembly for the purpose of changing the force acting between the magnetic elements.

6. In an electrical instrument, a stator assembly including a winding, a rotor assembly including a moving magnetic element, means mounting said rotor assembly for rotation relative to said stator assembly, and a second magnetic element associated with said stator assembly, said magnetic elements being positioned in the magnetic field produced by current flowing in said winding to develop a torque between said magnetic elements which is responsive to said current, said second magnetic element having a bevel and a male screw-threaded part, the axis of said part being substantially parallel to the axis of rotation of said moving magnetic element, said stator assembly having a female screw-threaded opening positioned to receive in threaded relationship said part, whereby rotation of said part in said opening moves said second magnetic element to vary the direction and/or magnitude of force acting between said magnetic elements with reference to the stator assembly.

7. In an electrical instrument, a stator assembly including a winding, a rotor assembly including a moving magnetic element, means mounting said rotor assembly for rotation relative to said stator assembly, a fixed magnetic element associated with said stator assembly, said magnetic elements being positioned in the magnetic field produced by current flowing in said winding to develop a repulsion force between said magnetic elements which is responsive to said current, and which tends to urge said rotor assembly in a predetermined direction about its axis of rotation, and an attraction magnetic element having a non-cylindrical surface for at least a portion of its length from its pole-end, disposed in said magnetic field to develop an attraction force acting between said attraction magnetic element and said moving magnetic element to urge said rotor assembly in said predetermined direction, said attraction magnetic element and said stator assembly having coacting threaded parts effective in response to relative rotation between said parts for rotating said attraction magnetic element and for urging said attraction magnetic element in a direction substantially parallel to said axis of rotation, whereby the magnitude and/or direction of said attraction force is adjustable.

DAVID B. WIESE.
HENRY L. BERNARDE.

REFERENCES CITED

The following references are of record in the file of this patent:

UNITED STATES PATENTS

| Number | Name | Date |
| --- | --- | --- |
| 404,470 | Daft | June 4, 1889 |
| 497,448 | Hoyt | May 16, 1893 |
| 2,179,305 | Stickney et al. | Nov. 7, 1939 |
| 2,179,952 | Pignolet | Nov. 14, 1939 |
| 2,183,566 | Hoare | Dec. 19, 1939 |
| 2,183,685 | Lingg | Dec. 19, 1939 |
| 2,501,356 | Rights | Mar. 21, 1950 |

FOREIGN PATENTS

| Number | Country | Date |
| --- | --- | --- |
| 509,235 | France | Nov. 4, 1920 |
| 296,749 | Great Britain | Sept. 7, 1928 |